US010564660B2

(12) United States Patent
Sobieski et al.

(10) Patent No.: US 10,564,660 B2
(45) Date of Patent: Feb. 18, 2020

(54) WATER HEATER ENERGY MANAGEMENT CONTROLLER

(71) Applicant: Telkonet, Inc., Waukesha, WI (US)

(72) Inventors: Jeff Sobieski, Waukesha, WI (US); Robert Zirpoli, Waukesha, WI (US)

(73) Assignee: Telkonet, Inc., Waukesha, WI (US)

( * ) Notice: Subject to any disclaimer, the term of this patent is extended or adjusted under 35 U.S.C. 154(b) by 184 days.

(21) Appl. No.: 15/892,190

(22) Filed: Feb. 8, 2018

(65) Prior Publication Data

US 2019/0243396 A1    Aug. 8, 2019

(51) Int. Cl.
  *G05D 23/19*   (2006.01)
  *F24D 19/10*   (2006.01)
  *F24H 9/20*    (2006.01)
  *F24F 120/10*  (2018.01)

(52) U.S. Cl.
  CPC ..... *G05D 23/1923* (2013.01); *F24D 19/1063* (2013.01); *F24H 9/2007* (2013.01); *G05D 23/1904* (2013.01); *G05D 23/1917* (2013.01); *F24F 2120/10* (2018.01)

(58) Field of Classification Search
  CPC ........... G05D 23/1904; G05D 23/1917; G05D 23/1923; F24D 19/1063; F24H 9/2007; F24F 2120/10
  See application file for complete search history.

(56) References Cited

U.S. PATENT DOCUMENTS

| | | | |
|---|---|---|---|
| 5,395,042 A | 3/1995 | Riley et al. | |
| 7,130,719 B2 | 10/2006 | Ehlers et al. | |
| 8,849,462 B2* | 9/2014 | Bodnar | G05B 13/026 700/276 |
| 9,535,434 B2 | 1/2017 | Stevens et al. | |
| 2008/0083834 A1 | 4/2008 | Krebs et al. | |
| 2008/0099570 A1 | 5/2008 | Krebs et al. | |
| 2010/0004790 A1 | 1/2010 | Harbin et al. | |
| 2016/0010879 A1 | 1/2016 | Rognli et al. | |
| 2016/0258635 A1 | 9/2016 | Zemach | |

* cited by examiner

*Primary Examiner* — Marc E Norman
(74) *Attorney, Agent, or Firm* — Foley & Lardner LLP (57) ABSTRACT

One example embodiment relates to a water heater controller. The water heater controller includes an operating conditions circuit structured to receive temperature measurement signals indicative of temperatures over time of water in a tank of a water heater, and occupancy measurement signals indicative of whether individuals are present in an area proximate the water heater. A drift threshold circuit is structured to, in response to the occupancy measurement signals indicating that an individual is present or not present, define a plurality of drift threshold levels to trigger operation of a heating element of the water heater. A control circuit is structured to controllably operate the heating element based on the occupancy measurement signals and on the plurality of drift threshold levels.

24 Claims, 4 Drawing Sheets

WATER HEATER ENERGY MANAGEMENT CONTROLLER

TECHNICAL FIELD

The present disclosure relates generally to the field of water heater control systems.

BACKGROUND

In general, water heaters heat and store hot water at a predetermined temperature for later usage. Water heaters typically include an insulated tank and a heating element structured to heat the water in the tank to the predetermined temperature. In various implementations, the heating element is operated using electricity, natural gas, or other fuel sources. Some electric water heaters include two heating elements: a top heating element heats the water in a top portion of the tank, and a bottom heating element heats the water in the bottom portion of the tank.

SUMMARY

One example embodiment relates to a water heater controller. The water heater controller includes an operating conditions circuit structured to receive temperature measurement signals indicative of temperatures over time of water in a tank of a water heater, and occupancy measurement signals indicative of whether individuals are present in an area proximate the water heater. A drift threshold circuit is structured to define a plurality of different drift threshold levels to trigger operation of a heating element of the water heater based at least in part on the occupancy measurement signals. A control circuit is structured to controllably operate the heating element based on the occupancy measurement signals and on the corresponding drift threshold level.

Another example embodiment relates to a method of controlling operation of a water heater. The method includes receiving operating condition measurement signals, including temperature measurement signals indicative of temperatures over time of water in a tank of a water heater, and occupancy measurement signals indicative of whether individuals are present in an area proximate the water heater. The method also includes defining a plurality of drift threshold levels to trigger operation of a heating element of the water heater. The plurality of drift threshold levels are defined based at least in part on the occupancy measurement signals. The method also includes controllably operating the heating element based on the occupancy measurement signals and on the corresponding drift threshold level.

Another embodiment relates to a method, including measuring first temperatures over time of water in a top tank portion of a water heater. First drift and drive curves of the top tank portion of the water heater are characterized based on the measured first temperatures. A first threshold recovery time associated with an occupancy status indicating occupancy and a second threshold recovery time associated with the occupancy status indicating non-occupancy are defined with regard to the top tank portion. A first recovery time required to drive the water in the top tank portion from the most recently measured temperature of the first temperatures to a first setpoint temperature is determined based on a most recently measured temperature of the first temperatures and the first drive curve. The occupancy status indicative of whether individuals are present in an area proximate the water heater is determined. The top heating element is operated in response to determining that: (1) the occupancy status indicates occupancy, and (2) the first recovery time is less than or equal to the first threshold recovery time. The top heating element is also operated in response to determining that: (1) the occupancy status indicates non-occupancy, and (2) the second recovery time is less than or equal to the second threshold recovery time.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Water heaters require a significant amount of energy to operate. For example, residential water heaters typically draw 3-5 kW of power and run several hours a day to maintain the water in the tank at a setpoint temperature (e.g., 120-130 degrees F.). Water heaters often operate the heating element(s) even when hot water is not needed, such as when nobody is home or when an individual is home but not using hot water. Additionally, water heaters with top and bottom heating elements may operate the bottom heating element to heat the water in the bottom tank portion even if there is sufficient hot water in the top tank section to meet demand. Therefore, existing water heater systems operate inefficiently.

Certain water heater control systems have attempted to improve energy efficiency using electronic control systems. For example, some water heaters include an electronic controller that may be programmed to control operation of the water heater based on a schedule. For example, a controller may be programmed to block operation of the heating elements at certain times of day, such as from 9:00 am-5:00 pm on Monday through Friday. This type of schedule works well for certain businesses and homes with occupants that have regular work schedules, but not for those with irregular schedules. For example, water heater schedulers may not work well for water heaters in certain homes, multi-dwelling units ("MDUs"), military housing units, etc. in which the times during which one or more occupants are home and using hot water are not reliably predictable.

The present disclosure relates to an energy management system for electric water heaters that controls operation of a water heater based at least in part on detected occupancy and variable drift threshold control, according to various embodiments. Variable drift threshold control is performed based on characterizations of drift and drive curves for the particular water heater being controlled. Some embodiments also control operation based on dynamic recovery time calculations. In various embodiments, intelligent control parameters are determined automatically in real-time. In some embodiments, control parameters are user-configurable (e.g., via a remote application). By providing dynamic intelligent control, the instant energy management system enables significant energy savings over existing water heater control systems, without compromising user comfort.

According to various embodiments, the energy management system determines different drift threshold temperatures for the heating element(s) based at least in part on a detected occupancy status of a controlled space to minimize energy usage while meeting predetermined comfort, health, and other criteria that may be preset by the users. For example, in some embodiments, the energy management system defines different drift threshold temperatures for the heating element(s) based on whether a received occupancy measurement signal indicates that an individual is present in an area proximate the water heater. In some embodiments, the drift threshold temperatures are set to lower levels in response to determining that an individual is not present relative to when an individual is present. Some embodiments include independently and dynamically controlling operation of the top and bottom heating elements.

The energy management system also takes into account variable comfort settings for different individuals as to both water temperature and recovery time, which is the time allowed for the temperature to recover to the preferred setting when individuals return from an absence.

Some embodiments include an application that provides a user interface accessible by an individual to control operation of the water heater. The application may be accessible locally on the water heater or remotely via a mobile device or web-based application. The application is structured to display usage history data, such as water temperature and volume characteristics, energy consumed, energy saved, drive state, etc. The data may include both historical data and real-time or near real-time data. The application is also accessible to allow a user to precisely control water heater operational parameters, such as drift threshold, operational state, comfort level, etc.

Figure 1:
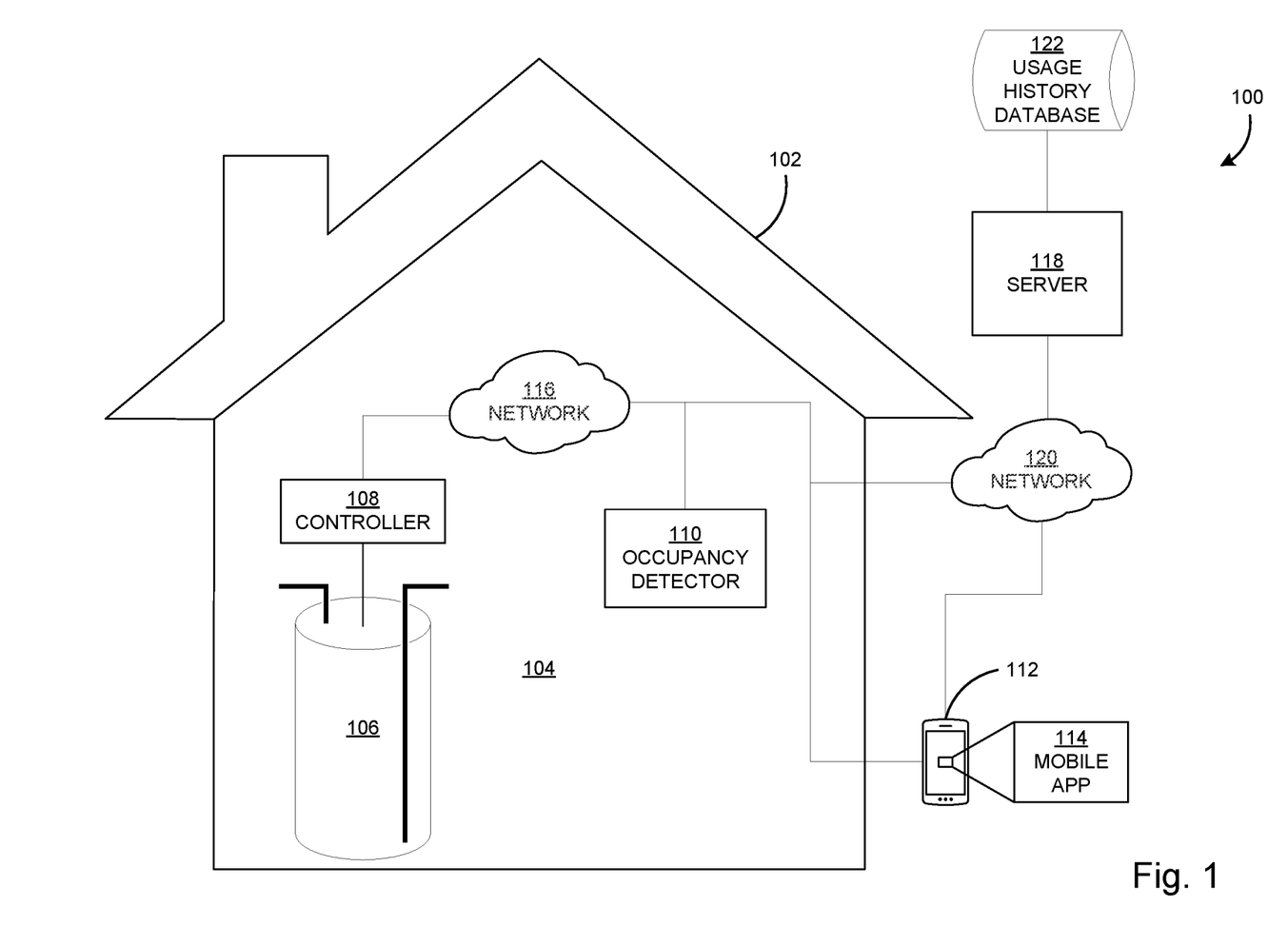
FIG. 1 is a schematic block diagram of an energy management system, according to an example embodiment.

FIG. 1 is a schematic block diagram of an energy management system 100, according to an example embodiment. The energy management system 100 includes a housing unit 102 that defines an occupancy space 104. The occupancy space 104 is an area occupied by individuals within the housing unit 102. The housing unit 102 may be a house, apartment, MDU, etc. in which one or more individuals use hot water.

The energy management system also includes a water heater 106, a controller 108, an occupancy detector 110, a smartphone 112, and a mobile application 114. The controller 108, the occupancy detector 110, and the smartphone 112 are in operative communication with each other via a first network 116. The first network 116 is a data exchange medium, which may include wireless networks (e.g., cellular networks, Bluetooth®, WiFi, ZigBee®, etc.), wired networks (e.g., Ethernet, DSL, cable, fiber-based, etc.), or a combination thereof. In some embodiments, the first network 116 is a private home area network ("HAN") accessible by the inhabitants of the housing unit 102.

The water heater 106 is structured to heat and store hot water at a predetermined temperature for later usage in the housing unit 102. The water heater 106 is described in further detail below in connection with FIG. 2.

The controller 108 is structured to control operation of the water heater 106. The controller 108 is also described in further detail below in connection with FIG. 2.

The occupancy detector 110 is structured to detect the presence of individuals within the occupancy space 104. The occupancy detector 110 includes an occupancy sensor that utilizes any of infrared, ultrasonic, microwave, or other technologies to detect the presence of individuals proximate the occupancy detector 110 (e.g., within the occupancy space 104). The occupancy detector 110 also includes a transmitter to transmit occupancy measurement signals indicative of whether individuals are present to the controller 108. Some embodiments include a plurality of occupancy detectors 110 positioned throughout the housing unit 102.

The smartphone 112 is structured to facilitate operative communication between an individual, the controller 108, and the occupancy detector 110 via the mobile application 114. Other embodiments similarly include a laptop, tablet, or desktop computer; a wearable computing device; a personal digital assistant; and/or other types of computing devices to perform the functions of the smartphone 112 as described herein.

The mobile application 114 is accessible by a user via the smartphone 112 in order to provide a user interface to the user to monitor and control operation of the water heater 106. The application is structured to display usage history data, such as water temperature and volume characteristics, energy consumed, energy saved, drive state, etc. The data may include both historical data and real-time or near real-time data. The application is also accessible to allow a user to precisely control water heater operational parameters, such as setpoint and drift threshold temperatures, recovery time, operational state, comfort level, etc. For example, a user can utilize the mobile application 114 to place the water heater 106 into an OFF state or to reduce the drift threshold temperature if the user is away from the housing unit 102 for an extended period of time.

The energy management system 100 also includes a server 118 in operative communication with the controller 108, the occupancy detector 110, and the smartphone 112 via a second network 120. A usage history database 122 is operatively coupled to the server 118. The second network 120 is a data exchange medium, which may include wireless networks (e.g., cellular networks, Bluetooth®, WiFi, ZigBee®, etc.), wired networks (e.g., Ethernet, DSL, cable, fiber-based, etc.), or a combination thereof. In some embodiments, the second network 120 includes the internet. The first network 116 is in operative communication with the second network 120. In some embodiments, the server 118 is structured to determine optimal operating parameters for the water heater 106 and transmit the operation parameters to the controller 108. The server 118 can also control operation of the water heater 106 based on demand response and load shedding control systems.

Figure 2:
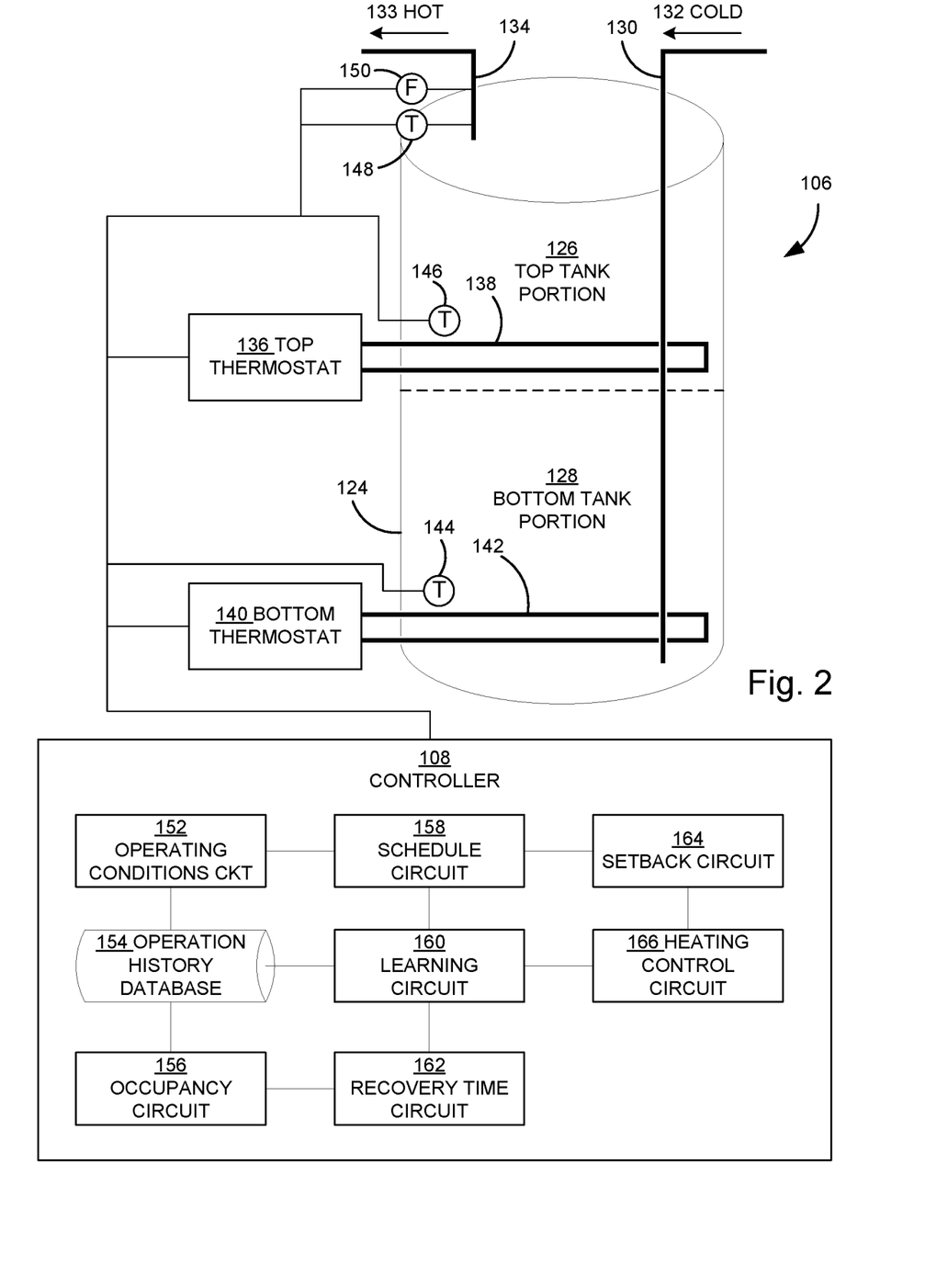
FIG. 2 is a schematic diagram of the water heater and the controller of the energy management system of FIG. 1, according to an example embodiment.

FIG. 2 is a schematic diagram of the water heater 106 and the controller 108 of FIG. 1. According to various embodiments, the water heater 106 is operated using electricity or natural gas. The water heater 106 includes a tank 124 defining a top tank portion 126 and a bottom tank portion 128. As used herein, the terms "top" and "bottom" are used in reference to the intended operational configuration of the water heater 106. In other words, the terms "top" and "bottom" are used with regard to a gravitational reference frame.

Cold water 130 is introduced to the bottom tank portion 128 via a cold water inlet 132. Hot water 133 is removed from the top tank portion 126 via a hot water outlet 134.

A top thermostat 136 is operatively coupled to the controller 108 and to a top heating element 138 positioned in the top tank portion 126. The top thermostat 136 is structured to controllably operate the top heating element 138 so as to heat water in the top tank portion 126.

A bottom thermostat 140 is operatively coupled to the controller 108 and to a bottom heating element 142 positioned in the bottom tank portion 128. The bottom thermostat 140 is structured to controllably operate the bottom heating element 142 so as to heat water in the bottom tank portion 128. Although the water heater 106 of FIG. 2 is shown with top and bottom thermostats 136, 140 and top and bottom heating elements 138, 142, it should be understood that in some embodiments, the water heater 106 includes only the bottom thermostat 140 and the bottom heating element 142.

The water heater 106 also includes several sensors in operative communication with the controller 108. For example, a first temperature sensor 144 positioned in the bottom tank portion 128 is structured to measure a temperature of the water in the bottom tank portion 128. A second temperature sensor 146 positioned in the top tank portion 126 is structured to measure a temperature of the water in the top tank portion 126. A third temperature sensor 148 positioned in or proximate the hot water outlet 134 is structured to measure a temperature of the water therein. A flow meter 150 operatively coupled to the hot water outlet 134 is structured to measure a flow rate of the water therein.

Hot water usage can be detected by the first and/or second temperature sensors 144, 146 or by the flow meter 150. For example, in some embodiments, hot water usage is determined by detecting a reduction in temperature of the water in one or both of the top and bottom tank portions 126, 128 due to additional cold water being introduced into the tank 124 to account for the hot water leaving the tank 124. The particular flow rate can be characterized based on the rate of change of temperature of the water in the tank 124. However, there may a certain amount of lag between the time that hot water usage begins and the time that additional cold water is introduced into the tank 124.

In other embodiments, hot water usage is determined via the flow meter 150. The flow meter 150 permits a faster configurable response for detecting hot water usage compared to using the first and/or second temperature sensors 144, 146 because the flow meter 150 directly measures the flow rate and there is no lag due to hot water being utilized before additional cold water is introduced into the tank 124.

The controller 108 includes an operating conditions circuit 152, an operation history database 154, an occupancy circuit 156, a schedule circuit 158, a learning circuit 160, a recovery time circuit 162, a drift threshold circuit 164, and a heating control circuit 166.

The operating conditions circuit 152 is in operative communication with various devices and sensors, such as the occupancy detector 110 (FIG. 1); the first, second, third, and fourth temperature sensors 144, 146, 148, and 150; and the flow meter 150. It should be understood that, according to various embodiments, the energy management system 100 includes other sensors in addition to those shown in the figures. The operating conditions circuit 152 is structured to receive and interpret measurement values from the various devices and sensors. The operating conditions interpreted from the various measurement values are used by other circuits of the controller 108 to control operation of the water heater 106. In some embodiments, the operating conditions circuit 152 logs measurement values over time and stores the logged measurement values in the operation history database 154. The historical measurement values may be analyzed by other circuits to define control parameters and also may be accessed by a user of the energy management system 100 via the mobile application 114.

The operation history database 154 is structured to store measured operation values for the water heater 106 and for other devices associated therewith. The measured operation values may include both historical operation data and real-time usage. The operation history database 154 may be accessed by an individual via the mobile application 114, through which the data may be visualized in various ways (e.g., charts, tables, etc.). The measured operation values may be structured as time series data sets and may also include computed values, such as maximum, minimum, and mean daily usage over a time period, among other types of computed values. In some embodiments, the operation history database 154 stores operation values of each particular individual's use.

The occupancy circuit 156 is structured to determine whether or not one or more individuals are currently present in the occupancy space 104. The occupancy circuit 156 is structured to receive occupancy measurement signals from the occupancy detector 110 and interpret an occupancy status based on the received occupancy measurement signals. In some embodiments, the occupancy status is binary YES/NO (or OCCUPIED/NOT OCCUPIED) status regarding whether individuals are present. In other embodiments, the occupancy circuit 156 is structured to determine the number of individuals present and/or the particular individuals present. As will be appreciated, different individuals may have different hot water usage characteristics. Therefore, by determining the particular individuals present, the controller 108 is able to tailor the operation of the water heater 106 to the specific requirements of different individuals. In still other embodiments, the occupancy circuit 156 determines a time since departure and/or an estimated time until arrival. As will be appreciated, an estimated time until arrival can be determined via interaction with other devices.

In some embodiments, the occupancy circuit 156 receives occupancy measurement signals from devices other than the occupancy detector 110. For example, in some embodiments, the occupancy circuit 156 receives signals from other components in and proximate the housing unit 102, such as operational signals from light switches, appliances, garage door openers, power meters, a connected car, etc. In some embodiments, the occupancy circuit 156 receives geolocation signals from the smartphone 112. The geolocation signals may indicate an absolute location of the smartphone 112, such as GPS coordinates. The geolocation signals may also indicate a relative location of the smartphone 112, relative to another component, such as the controller 108 or the occupancy detector 110. For example, the occupancy circuit 156 may define geofencing parameters that define boundaries of a physical area in which an individual's presence results in an affirmative occupancy status. In some embodiments, the occupancy circuit 156 receives signals (e.g., GPS coordinates, velocity, etc.) from a connected car associated with the individuals in the housing unit 102.

In some embodiments, the occupancy circuit 156 determines the particular individuals present in the occupied space based on occupancy measurement signals received from devices (e.g., the smartphone 112) associated with each individual, via either a push or pull arrangement. For example, in one embodiment, each individual of the occupancy space 104 pairs his or her smartphone 112 with the controller 108 (e.g., via the mobile application 114). The occupancy circuit 156 receives occupancy measurement signals that include an identifier associated with the particular individual or with the smartphone 112 of the individual. Accordingly, the occupancy circuit 156 can determine which particular individuals are present at any given time. In other embodiments, the particular individuals present are determined based on other factors, such as via facial recognition or other biometric indicators.

In some embodiments, the occupancy circuit 156 determines an estimated time of arrival of one or more individuals to the housing unit 102. For example, the occupancy circuit 156 may analyze the location of the smartphone 112 relative to the housing unit 102 to estimate an amount of time required for the individual to traverse that distance. As will be appreciated, the controller can utilize the estimated time of arrival in connection with the recovery time circuit 162 and the drift threshold circuit 164 to control the water heater 106 so as to ensure an adequate supply of hot water is available when the individual is likely to use it.

The schedule circuit 158 is structured to define operating schedules that specify different operating conditions of the water heater 106. The operating schedules may be defined based on scheduled occupancy and/or scheduled usage. The operating schedules may be user-defined, for example, according to user input via the mobile application 114. The schedule circuit 158 may also define operating schedules based on past occupancy and/or usage data (e.g., retrieved from the operation history database 154). As will be appreciated, the schedule circuit 158, in operation with the learning circuit 160, may refine operating schedules over time based on actual usage, actual occupancy, individual preferences, etc.

The schedule circuit 158 may also be structured to define different operating modes for the water heater 106. Table 1 below illustrates several example operating modes for the water heater 106. As shown in Table 1, the water heater 106 includes different operating modes for "home," "away," "extended away," and "sleep." The operating modes can be triggered in various ways, such as via the occupancy status determined by the occupancy circuit 156. For example, if the occupancy circuit 156 indicates that the occupancy status is "occupied," the water heater 106 will enter the "home" mode. If the occupancy circuit 156 indicates that the occupancy status is "not occupied," the water heater 106 will enter the "away" mode. If the occupancy circuit 156 indicates that the occupancy status is "not occupied" continuously for more than three days, the water heater 106 will enter the "extended away" mode. The schedule circuit 158 can select the "sleep" mode based on scheduled sleep times indicated by an internal clock in the controller 108 and/or based on the occupancy detector.

TABLE 1

WATER HEATER OPERATING MODES

| MODE | DETECTION | OPERATION |
|------|-----------|-----------|
| HOME | OCCUPIED | TOP TANK DRIFT THRESHOLD = 10° F. BOTTOM TANK DRIFT THRESHOLD = 20° F. |
| AWAY | NOT OCCUPIED | TOP TANK DRIFT THRESHOLD = 20° F. BOTTOM TANK DRIFT THRESHOLD = 40° F. |
| EXTENDED AWAY | NOT OCCUPIED FOR >3 DAYS | TOP TANK DRIFT THRESHOLD = 40° F. BOTTOM TANK DRIFT THRESHOLD = 50° F. |
| SLEEP | CLOCK, OCCUPANCY DETECTOR | TOP TANK DRIFT THRESHOLD = 20° F. BOTTOM TANK DRIFT THRESHOLD = 30° F. |

As shown in Table 1, each mode can include different drift threshold temperatures for each of the top and bottom tank portions 126, 128. Similarly (although not shown), each mode can also include different recovery time values. The drift threshold temperatures can be user-defined or pre-programmed. As shown in Table 1, the drift threshold temperatures are lower when the individual is home versus away. This allows the temperature in the water heater to drop further before activating the heating elements, thereby saving energy. In some embodiments, the schedule circuit 158 allows the bottom tank portion 128 or both the top and bottom tank portions 126, 128 to drop to an ambient temperature in certain modes. In other words, the corresponding top and bottom heating elements 138, 142 are not operated in these modes. In some embodiments, the drift threshold temperature of the bottom tank portion 128 is significantly lower than that of the top portion 126. Therefore, at least some relatively hot water will be available for use from the top tank portion 126 while the water in the bottom tank portion 128 is being heated.

The learning circuit 160 is structured to adjust the operating parameters of the water heater 106 based on actual detected occupancy and/or usage over time. For example, the learning circuit 160 may analyze occupancy and/or operation parameters over a certain time period (e.g., 30 days) to identify patterns in occupancy and/or usage. As will be appreciated, combining a learned schedule along with knowledge of tank recovery time allows for very deep drift threshold without requiring any re-programming.

In some embodiments, the learning circuit 160 is structured to monitor hot water usage over time relative to the time at which occupancy is detected. This can be used in connection with the recovery time circuit 162 and the drift threshold circuit 164 to ensure that a sufficient amount of hot water is available to an individual when he or she needs it. For example, some individuals may typically wash their hands shortly after they get home but typically do not take a shower until a longer time after they have been home. In some embodiments, the learning circuit 160 adjusts the operating parameters of the water heater for each individual in the housing unit 102.

In some embodiments, the learning circuit 160 is structured to monitor hot water usage over time relative to the time at which occupancy is detected for each of various individuals in the housing unit 102. As noted above, in some embodiments, the occupancy circuit 156 determines the particular individuals that are present in the occupancy space 104. The learning circuit 160 characterizes water usage for each individual. In some embodiments, hot water usage for each individual is determined only when that individual is the only individual present. In some embodiments, the learning circuit 160 characterizes water usage for certain combinations of individuals (e.g., husband and wife, wife and kids, etc.).

The recovery time circuit 162 is structured to characterize the amount of time required to drive the temperature of the water in the tank from an initial temperature to a threshold temperature. Recovery time varies between water heaters based on various parameters, such as tank capacity, number and power of heating elements, control algorithms, etc. Accordingly, the recovery time circuit 162 characterizes recovery time of the water heater 106 based on monitored operating parameters of the water heater 106 over time.

The recovery time circuit 162 characterizes recovery time by estimating drift and drive curves for the water heater 106. The term "drift," with regard to water heaters, refers to a change in temperature of the water in the top and/or bottom tank portions 126, 128 when the top and/or bottom heating elements 138, 142 are not in operation. Drift can be caused by heat transfer from the water in the tank 124 to the ambient environment and by introducing additional cold water into the tank 124. The term "drive," with regard to water heaters, refers to a change in temperature of the water in the top and/or bottom tank portions 126, 128 when the top and/or bottom heating elements 138, 142 are in operation. As will be appreciated, drive characteristics also depend on whether additional cold water is being introduced into the tank 124. The term "recovery time" refers to an amount of time required to drive the temperature of the water in the top and/or bottom tank portions 126, 128 from an initial temperature to a threshold temperature. It should be understood that drift, drive, and recovery time can be characterized for each of (1) the water in the top tank portion 126; (2) the water in the bottom tank portion 128; and (3) for water in the entire tank 124. It should be appreciated that drift, drive, and recovery time for the water in the top or bottom tank portions 126, 128 changes based on the characteristics of the water in the other of the top and bottom tank portions 126, 128. Accordingly, the recovery time circuit 162 characterizes the drift, drive, and recovery time for each of the top and bottom tank portions 126, 128 based at least in part of the temperature in the other of the top and bottom tank portions 126, 128, based on operation (e.g., power level) of each of the top and bottom heating elements 138, 142, based on hot water usage, and based on other factors.

The recovery time circuit 162 obtains historical operation data from the operation history database 154 and identifies various drift periods and drive periods. For example, the water heater 106 may be in a drift period if the temperature of the water in the tank is decreasing over time. Conversely, the water heater 106 may be in a drive period if the temperature of the water in the tank is increasing over time. Drift and drive periods can also be determined based on whether the top or bottom heating elements 138, 142 are on (drive) or off (drift).

The recovery time circuit 162 calculates a plurality of drift and drive curves based on the identified operation data. The recovery time circuit 162 determines a curve (e.g., defined by an exponential equation) that best fits the operation data. More specifically, the recovery time circuit 162 calculates theoretical temperature values for each sample time in an operation data set based on the curve fit to that data set and calculates a fit value for the curve by comparing the theoretical temperature values with the measured operation values. The curve with the highest fit value is used to predict future temperature versus time behavior for the water heater 106.

For example, in one embodiment, the recovery time circuit 162 is structured to define a first recovery time curve defining a relationship between a first initial temperature of the water in the top tank portion 126 and a first recovery time required to drive the water in the top tank portion 126 from the first initial temperature to a first setpoint temperature for a plurality of first initial temperatures. The recovery time circuit 162 is also structured to define a second recovery time curve defining a relationship between a second initial temperature of the water in the bottom tank portion 128 and a second recovery time required to drive the water in the bottom tank portion 128 from the second initial temperature to a second setpoint temperature for a plurality of second initial temperatures.

The drift threshold circuit 164 is structured to define variable drift threshold levels for the top and bottom tank portions 126, 128 based on detected occupancy and user-defined parameters. In some embodiments, the drift threshold circuit 164 is structured to define drift threshold levels based on an operating mode of the water heater 106, as described above in connection with the schedule circuit 158. As described above, the drift threshold levels define a threshold temperature of the water in the top or bottom tank portions 126, 128 that triggers operation of the respective top or bottom heating element 138, 142.

In one embodiment, the drift threshold circuit 164 is structured to define first and second drift threshold levels in response to the occupancy measurement signals indicating that an individual is present. The first drift threshold level defines a first threshold temperature of the water in the top tank portion 126 to trigger operation of the top heating element 138. The second drift threshold level defines a second threshold temperature of the water in the bottom tank portion 128 to trigger operation of the bottom heating element 142. The second drift threshold level is lower than the first drift threshold level. In other words, the water in the bottom tank portion 128 is permitted to drift further than the water in the top tank portion 126 before operating the respective top or bottom heating element 138, 142.

The drift threshold circuit 164 is also structured to define third and fourth drift threshold levels in response to the occupancy measurement signals indicating that an individual is not present. The third drift threshold level defines a third threshold temperature of the water in the top tank portion 126 to trigger operation of the top heating element 138. The third drift threshold level is lower than the first drift threshold level. In other words, the water in the top tank portion 126 is permitted to drift further when an individual is not present rather than present. The fourth drift threshold level defines a fourth threshold temperature of the water in the bottom tank portion 128 to trigger operation of a bottom heating element 142. The fourth drift threshold level is lower than the second drift threshold level. In other words, the water in the bottom tank portion 128 is permitted to drift further when an individual is not present rather than present.

The heating control circuit 166 is structured to control operation of the top and bottom heating elements 138, 142 in connection with each of the operating conditions circuit 152, the occupancy circuit 156, the schedule circuit 158, the learning circuit 160, the recovery time circuit 162, and the drift threshold circuit 164. In particular, the heating control circuit 166 is structured to transmit control signals to each of the top and bottom thermostats 136, 140 to control operation of the respective top and bottom heating elements 138, 142. In some embodiments, the heating control circuit 166 is structured to transmit a binary ON/OFF signal to the top and bottom thermostats 136, 140. However, in other embodiments, the heating control circuit 166 is structured to transmit variable operation signals (e.g., FULL POWER, 75% POWER, 50% POWER, 25% POWER, and OFF) to the top and bottom thermostats 136, 140.

Figure 3:
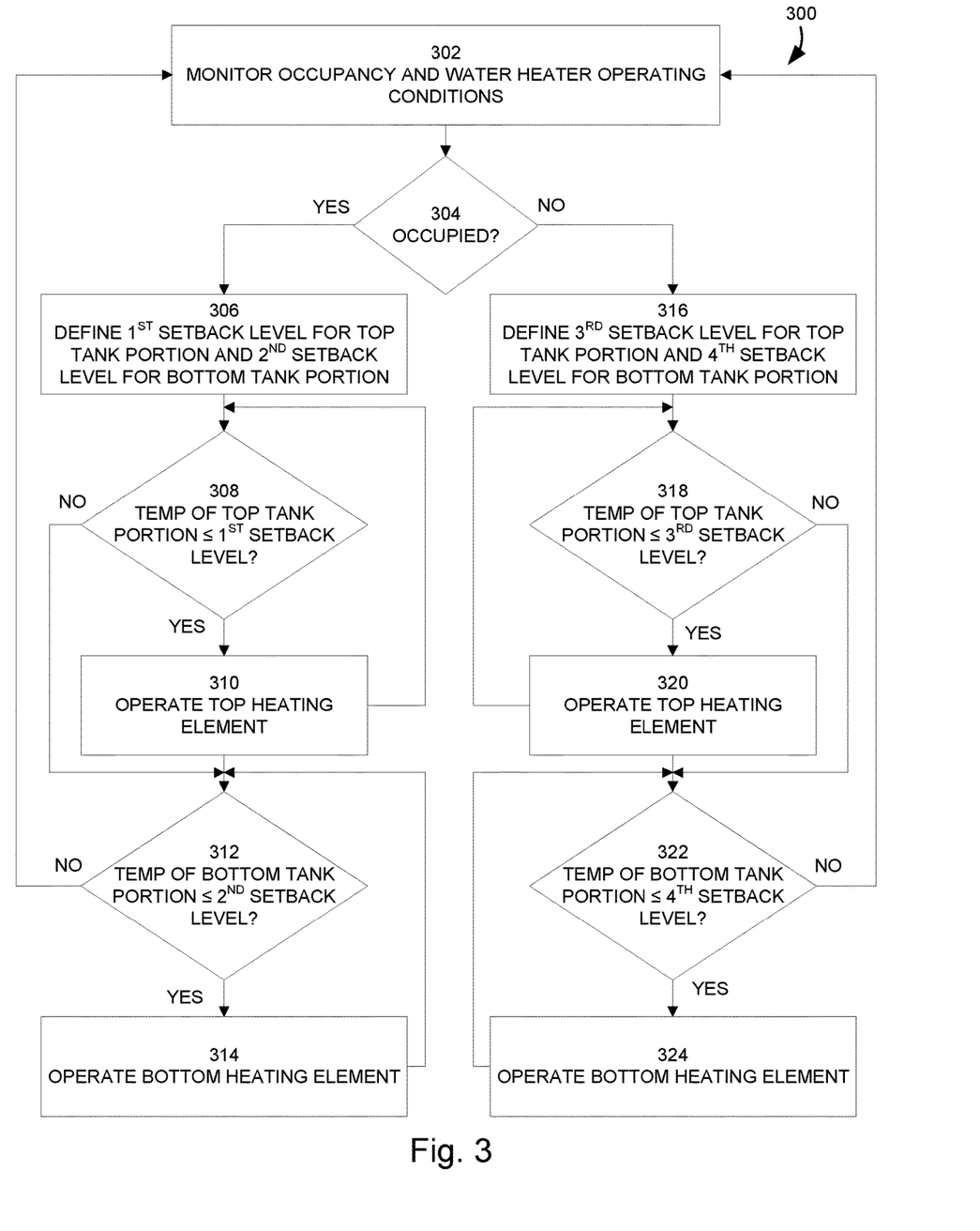
FIG. 3 is a flow diagram of a method of controlling the water heater of FIGS. 1 and 2 based on dynamic drift threshold levels and detected occupancy, according to an example embodiment.

FIG. 3 is a flow diagram of a method 300 of controlling the water heater 106 of FIGS. 1 and 2 based on dynamic drift threshold levels and detected occupancy, according to an example embodiment. The method 300 is described below as being performed by the controller 108 of FIGS. 1 and 2. However, the method 300 may similarly be performed using other systems and devices. Additionally, the method 300 is described with regard to the water heater 106 of FIGS. 1 and 2 including top and bottom thermostats 136, 140 and top and bottom heating elements 138, 142. However, it should be understood that the method 300 may be similarly performed using water heaters having only the bottom thermostat 140 and the bottom heating element 142. For example, the method 300 can be performed using either electric or natural gas water heaters. In general, the method 300, as illustrated in FIG. 3, includes defining different drift threshold levels for the top and bottom tank portions 126, 128 based on an occupancy status, and operating the top and bottom heating elements 138, 142 based on the dynamic drift threshold levels.

At 302, occupancy and water heater operating conditions are monitored. Occupancy is monitored via occupancy measurement signals received from the occupancy detector 110, which are indicative of whether individuals are present in an area proximate the water heater 106. First temperature measurement signals are received from the second temperature sensor 146. The first temperature measurement signals are indicative of first temperatures over time of water in the top tank portion 126 of the water heater 106. Second temperature measurement signals are received from the first temperature sensor 146. The second temperature measurement signals are indicative of second temperatures over time of water in the bottom tank portion 128 of the water heater 106. The water heater operating conditions may also include other measured parameters, such as operational status of the top and bottom heating elements 138, 142, hot water usage (e.g., flowrate through the hot water outlet 134). The measured values are stored in the operation history database 154.

At 304, it is determined whether individuals are present in the occupancy space 104. The occupancy status is determined based on the received occupancy measurement signals. The occupancy status can include a YES/NO value, where YES indicates that individuals are present in the occupancy space 104 and NO indicates that individuals are not present in the occupancy space 104.

At 306, in response to the answer at 304 being YES (indicating that the space is occupied), first and second drift threshold levels are defined. The first drift threshold level defines a first threshold temperature of the water in the top tank portion 126 to trigger operation of the top heating element 138. The second drift threshold level defines a second threshold temperature of the water in the bottom tank portion 128 to trigger operation of the bottom heating element 142. The second drift threshold level is lower than the first drift threshold level.

At 308, it is determined whether the temperature of the water in the top tank portion 126 (e.g., via the most recent first temperature measurement signal) is less than or equal to the first drift threshold level defined at 306.

At 310, in response to the answer to 308 being YES (indicating that the temperature of the water in the top tank portion 126 has fallen below the first drift threshold level), the top heating element 138 is operated. The top heating element 138 is operated until the temperature of the water in the top tank portion 126 is greater than the first drift threshold level. In some embodiments, the top heating element 138 is operated until the temperature of the water in the top tank portion 126 exceeds a temperature threshold above the first drift threshold level (e.g., 10 degrees F. above the first drift threshold level).

At 312, in response to the answer to 308 being NO (indicating that the temperature of the water in the top tank portion 126 is greater than the first drift threshold level), it is determined whether the temperature of the water in the bottom tank portion 128 (e.g., via the most recent second temperature measurement signal) is less than or equal to the second drift threshold level defined at 306.

At 314, in response to the answer to 312 being YES (indicating that the temperature of the water in the bottom tank portion 128 has fallen below the second drift threshold level), the bottom heating element 310 is operated. The bottom heating element 142 is operated until the temperature of the water in the bottom tank portion 128 is greater than the second drift threshold level. In some embodiments, the bottom heating element 142 is operated until the temperature of the water in the bottom tank portion 128 exceeds a temperature threshold above the second drift threshold level (e.g., 10 degrees F. above the first drift threshold level).

In response to the answer to both 308 and 312 being NO (indicating that the temperature of the water in the top and bottom tank portions 126, 128 is greater than the respective first and second drift threshold levels), the method 300 returns to 302. It should be understood that 308 and 312 may be performed in parallel or in series.

At 316, in response to the answer at 304 being NO (indicating that the space is not occupied), third and fourth drift threshold levels are defined. The third drift threshold level defines a third threshold temperature of the water in the top tank portion 126 to trigger operation of the top heating element 138. The fourth drift threshold level defines a fourth threshold temperature of the water in the bottom tank portion 128 to trigger operation of the bottom heating element 142. The fourth drift threshold level is lower than the third drift threshold level.

At 318, it is determined whether the temperature of the water in the top tank portion 126 (e.g., via the most recent first temperature measurement signal) is less than or equal to the third drift threshold level defined at 316.

At 320, in response to the answer to 318 being YES (indicating that the temperature of the water in the top tank portion 126 has fallen below the third drift threshold level), the top heating element 138 is operated. The top heating element 138 is operated until the temperature of the water in the top tank portion 126 is greater than the third drift threshold level. In some embodiments, the top heating element 138 is operated until the temperature of the water in the top tank portion 126 exceeds a temperature threshold above the third drift threshold level (e.g., 10 degrees F. above the third drift threshold level).

At 322, in response to the answer to 318 being NO (indicating that the temperature of the water in the top tank portion 126 is greater than the third drift threshold level), it is determined whether the temperature of the water in the bottom tank portion 128 (e.g., via the most recent second temperature measurement signal) is less than or equal to the fourth drift threshold level defined at 316.

At 324, in response to the answer to 322 being YES (indicating that the temperature of the water in the bottom tank portion 128 has fallen below the fourth drift threshold level), the bottom heating element 310 is operated. The bottom heating element 142 is operated until the temperature of the water in the bottom tank portion 128 is greater than the fourth drift threshold level. In some embodiments, the bottom heating element 142 is operated until the temperature of the water in the bottom tank portion 128 exceeds a temperature threshold above the fourth drift threshold level (e.g., 10 degrees F. above the first drift threshold level).

In response to the answer to both 318 and 322 being NO (indicating that the temperature of the water in the top and bottom tank portions 126, 128 is greater than the respective third and fourth drift threshold levels), the method 300 returns to 302. It should be understood that 318 and 322 may be performed in parallel or in series.

Figure 4:
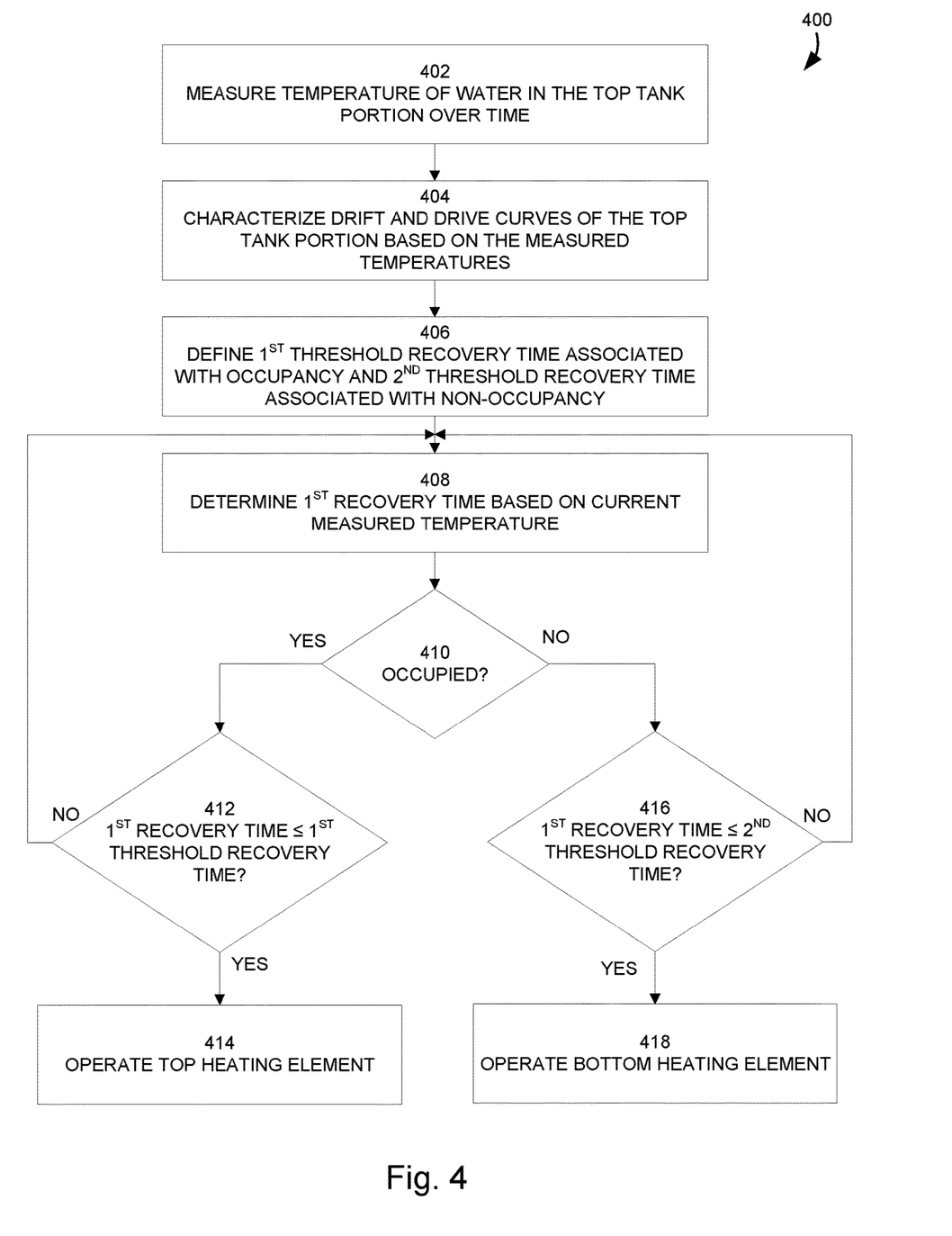
FIG. 4 is a flow diagram of a method of controlling the water heater of FIGS. 1 and 2 based on dynamic recovery time and detected occupancy, according to an example embodiment.

FIG. 4 is a flow diagram of a method 400 of controlling the water heater 106 of FIGS. 1 and 2 based on dynamic recovery time and detected occupancy, according to an example embodiment. Similar to the method 300, the method 400 is described below as being performed by the controller 108 of FIGS. 1 and 2. However, the method 400 may similarly be performed using other systems and devices. Additionally, the method 400 is described with regard to the water heater 106 of FIGS. 1 and 2 including top and bottom thermostats 136, 140 and top and bottom heating elements 138, 142. However, it should be understood that the method 400 may be similarly performed using water heaters having only the bottom thermostat 140 and the bottom heating element 142. For example, the method 400 can be performed using either electric or natural gas water heaters. In general, the method 400 includes characterizing drift and drive curves of the top tank portion 126, defining different threshold recovery times based on occupancy and non-occupancy, and controlling operation of the top heating element 138 based on a comparison between a current recovery time determined by the drive curve and the threshold recovery time. Although the method 400 is shown only with respect to operation of the top heating element 138, the method 400 may also include controlled operation of the bottom heating element 142, similar to how the method 300 of FIG. 3 is structured.

At 402, first temperatures over time of water in the top tank portion 126 are measured. At 404, first drift and drive curves of the top tank portion 126 are characterized based on the measured first temperatures. Characterization of the drift and drive curves is described in further detail above in connection with FIG. 2.

At 406, first and second threshold recovery times are defined. The first threshold recovery time is associated with an occupancy status indicating occupancy. The second threshold recovery time is associated with the occupancy status indicating non-occupancy.

At 408, a first recovery time is determined based on a most recently measured temperature of the first temperatures and the first drive curve. The first recovery time is a time required to drive the water in the top tank portion 126 from the most recently measured temperature of the first temperatures to a first setpoint temperature.

At 410, the occupancy status is determined. At 412, in response to the answer to 410 being YES, it is determined whether the first recovery time is less than or equal to the first threshold recovery time. At 414, in response to the answer to both 410 and 412 being YES, the top heating element 138 is operated. Similar to the method 300, the top heating element 138 may be operated until the water in the top tank portion 126 reaches a threshold temperature. In response to the answer to 412 being NO, the method 400 continues to 408 based on a new measured temperature.

At 416, in response to the answer to 410 being NO, it is determined whether the first recovery time is less than or equal to the second threshold recovery time. At 418, in response to the answer to both 410 and 416 being YES, the top heating element 138 is operated. In response to the answer to 418 being NO, the method 400 continues to 408 based on a new measured temperature.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A water heater controller, comprising:
an operating conditions circuit structured to receive:
temperature measurement signals indicative of temperatures over time of water in a tank of a water heater, and
occupancy measurement signals indicative of whether individuals are present in an area proximate the water heater;
a drift threshold circuit structured to define a plurality of drift threshold levels to trigger operation of a heating element of the water heater, the plurality of drift threshold levels defined based at least in part on the occupancy measurement signals; and
a control circuit structured to controllably operate a heating element of the water heater based on the occupancy measurement signals and on the corresponding drift threshold level.

2. The water heater controller of claim 1,
wherein the tank of the water heater includes a top tank portion and a bottom tank portion;
wherein the temperature measurement signals include:
first temperature measurement signals indicative of first temperatures over time of water in the top tank portion, and
second temperature measurement signals indicative of second temperatures over time of water in the bottom tank portion; and
wherein the plurality of drift threshold levels defined by the drift threshold circuit include different drift threshold levels for each of the top and bottom tank portions.

3. The water heater controller of claim 2,
wherein the heating element is a bottom heating element; and
wherein the plurality of drift threshold levels defined by the drift threshold circuit include:
a first drift threshold level comprising a first threshold temperature of the water in the top tank portion to trigger operation of a top heating element of the water heater in response to the occupancy measurement signals indicating that an individual is present,
a second drift threshold level comprising a second threshold temperature of the water in the bottom tank portion to trigger operation of the bottom heating element in response to the occupancy measurement signals indicating that an individual is present, the second drift threshold level being lower than the first drift threshold level, a third drift threshold level comprising a third threshold temperature of the water in the top tank portion to trigger operation of the top heating element in response to the occupancy measurement signals indicating that an individual is not present, the third drift threshold level being lower than the first drift threshold level, and
    a fourth drift threshold level comprising a fourth threshold temperature of the water in the bottom tank portion to trigger operation of the bottom heating element in response to the occupancy measurement signals indicating that an individual is not present, the fourth drift threshold level being lower than the second drift threshold level.

4. The water heater controller of claim 3, wherein the control circuit is structured to:
  in response to the occupancy measurement signals indicating that an individual is present,
    operate the top heating element in response to the first temperature measurement signals indicating that the first temperature of the water in the top tank portion is less than the first drift threshold level, and
    operate the bottom heating element in response to the second temperature measurement signals indicating that the second temperature of the water in the bottom tank portion is less than the second drift threshold level; and
  in response to the occupancy measurement signals indicating that an individual is not present,
    operate the top heating element in response to the first temperature measurement signals indicating that the first temperature of the water in the top tank portion is less than the third drift threshold level, and
    operate the bottom heating element in response to the second temperature measurement signals indicating that the second temperature of the water in the bottom tank portion is less than the fourth drift threshold level.

5. The water heater controller of claim 2, further comprising a recovery time circuit structured to define:
  a first recovery time curve defining a relationship between a first initial temperature of the water in the top tank portion and a first recovery time required to drive the water in the top tank portion from the first initial temperature to a first setpoint temperature for a plurality of first initial temperatures, and
  a second recovery time curve defining a relationship between a second initial temperature of the water in the bottom tank portion and a second recovery time required to drive the water in the bottom tank portion from the second initial temperature to a second setpoint temperature for a plurality of second initial temperatures.

6. The water heater controller of claim 5, wherein the recovery time circuit is further structured to:
  define an occupied threshold recovery time; and
  define dynamic drift threshold levels, including:
    a first drift threshold level defined, based on the first temperature of the water in the top tank portion and the first recovery time curve, so as to ensure that the first temperature reaches the first setpoint temperature by expiration of the occupied threshold recovery time, and
    a second drift threshold level defined, based on the second temperature of the water in the bottom tank portion and the second recovery time curve, so as to ensure that the second temperature reaches the second setpoint temperature by expiration of the occupied threshold recovery time.

7. The water heater controller of claim 6, wherein the recovery time circuit is further structured to:
  define a non-occupied threshold recovery time; and
  define dynamic drift threshold levels, including:
    a third drift threshold level defined, based on the first temperature of the water in the top tank portion and the first recovery time curve, so as to ensure that the first temperature reaches the first setpoint temperature by expiration of the non-occupied threshold recovery time, and
    a fourth drift threshold level defined, based on the second temperature of the water in the bottom tank portion and the second recovery time curve, so as to ensure that the second temperature reaches the second setpoint temperature by expiration of the non-occupied threshold recovery time.

8. The water heater controller of claim 7, wherein the occupancy circuit is further structured to:
  receive a geolocation signal indicative of a physical location of an individual;
  estimate a time until arrival of the individual; and
  operate the top heating element in response to the estimated time until arrival being less than or equal to the non-occupied threshold recovery time.

9. The water heater controller of claim 7,
  wherein the operating conditions circuit is further structured to monitor hot water usage over time; and
  further comprising a learning circuit structured to determine a hot water usage latency by characterizing hot water usage over time relative to the occupancy measurement signals indicating a change in occupancy status from not occupied to occupied,
  wherein the non-occupied threshold recovery time is determined relative to the hot water usage latency.

10. The water heater controller of claim 9,
  wherein the occupancy measurement signals include an identifier associated with each individual that is present,
  wherein the learning circuit is structured to determine hot water usage latency for each of a plurality of individuals, and
  wherein the non-occupied threshold recovery time is determined relative to the hot water usage latency for each of the plurality of individuals.

11. The water heater controller of claim 1, wherein the control circuit is further structured to override operation of the heating element based on an operation command received from a device associated with an individual.

12. A method of controlling operation of a water heater, the method comprising:
  receiving operating condition measurement signals, comprising:
    temperature measurement signals indicative of temperatures over time of water in a tank of a water heater, and
    occupancy measurement signals indicative of whether individuals are present in an area proximate the water heater;
  defining a plurality of drift threshold levels to trigger operation of a heating element of the water heater, the plurality of drift threshold levels defined based in part on the occupancy measurement signals; and
  controllably operating the top and bottom heating elements based on the occupancy measurement signals and on the corresponding drift threshold level.

13. The method of claim 12,
wherein the tank of the water heater includes a top tank portion and a bottom tank portion;
wherein the temperature measurement signals include:
- first temperature measurement signals indicative of first temperatures over time of water in the top tank portion, and
- second temperature measurement signals indicative of second temperatures over time of water in the bottom tank portion; and wherein the plurality of drift threshold levels include different drift threshold levels for each of the top and bottom tank portions.

14. The method of claim 13,
wherein the heating element is a bottom heating element; and
wherein defining the plurality of drift threshold levels includes:
- defining a first drift threshold level comprising a first threshold temperature of the water in the top tank portion to trigger operation of a top heating element of the water heater in response to the occupancy measurement signals indicating that an individual is present,
- defining a second drift threshold level comprising a second threshold temperature of the water in the bottom tank portion to trigger operation of the bottom heating element in response to the occupancy measurement signals indicating that an individual is present, the second drift threshold level being lower than the first drift threshold level,
- defining a third drift threshold level comprising a third threshold temperature of the water in the top tank portion to trigger operation of the top heating element in response to the occupancy measurement signals indicating that an individual is not present, the third drift threshold level being lower than the first drift threshold level, and
- defining a fourth drift threshold level comprising a fourth threshold temperature of the water in the bottom tank portion to trigger operation of the bottom heating element in response to the occupancy measurement signals indicating that an individual is not present, the fourth drift threshold level being lower than the second drift threshold level.

15. The method of claim 14, further comprising:
in response to the occupancy measurement signals indicating that an individual is present,
- operating the top heating element in response to the first temperature measurement signals indicating that the first temperature of the water in the top tank portion is less than the first drift threshold level, and
- operating the bottom heating element in response to the second temperature measurement signals indicating that the second temperature of the water in the bottom tank portion is less than the second drift threshold level; and in response to the occupancy measurement signals indicating that an individual is not present,
- operating the top heating element in response to the first temperature measurement signals indicating that the first temperature of the water in the top tank portion is less than the third drift threshold level, and
- operating the bottom heating element in response to the second temperature measurement signals indicating that the second temperature of the water in the bottom tank portion is less than the fourth drift threshold level.

16. The method of claim 13, further comprising:
- defining a first recovery time curve, the first recovery time curve defining a relationship between a first initial temperature of the top tank portion and a first recovery time required to drive the water in the top tank portion from the first initial temperature to a first setpoint temperature for a plurality of first initial temperatures; and
- defining a second recovery time curve, the second recovery time curve defining a relationship between a second initial temperature of the bottom tank portion and a second recovery time required to drive the water in the bottom tank portion from the second initial temperature to a second setpoint temperature for a plurality of second initial temperatures.

17. The method of claim 16, further comprising:
- defining an occupied threshold recovery time; and
- defining dynamic drift threshold levels, including:
  - the first drift threshold level defined, based on the first temperature of the water in the top tank portion and the first recovery time curve, so as to ensure that the first temperature reaches the first setpoint temperature by expiration of the occupied threshold recovery time, and
  - the second drift threshold level defined, based on the second temperature of the water in the bottom tank portion and the second recovery time curve, so as to ensure that the second temperature reaches the second setpoint temperature by expiration of the occupied threshold recovery time.

18. The method of claim 17, wherein the recovery time circuit is further structured to:
- define a non-occupied threshold recovery time; and
- define dynamic drift threshold levels, including:
  - the third drift threshold level defined, based on the first temperature of the water in the top tank portion and the first recovery time curve, so as to ensure that the first temperature reaches the first setpoint temperature by expiration of the non-occupied threshold recovery time, and
  - the fourth drift threshold level defined, based on the second temperature of the water in the bottom tank portion and the second recovery time curve, so as to ensure that the second temperature reaches the second setpoint temperature by expiration of the non-occupied threshold recovery time.

19. The method of claim 18, further comprising:
- monitoring hot water usage over time; and
- determining hot water usage latency by characterizing hot water usage over time relative to the occupancy measurement signals indicating a change in occupancy status from not occupied to occupied,
wherein the non-occupied threshold recovery time is determined relative to the hot water usage latency.

20. The method of claim 19, further comprising:
- receiving a geolocation signal indicative of a physical location of an individual;
- estimating a time until arrival of the individual; and
- operating the top heating element in response to the estimated time until arrival being less than or equal to the non-occupied threshold recovery time.

21. A method, comprising:
measuring first temperatures over time of water in a top tank portion of a water heater;

characterizing first drift and drive curves of the top tank portion of the water heater based on the measured first temperatures;

defining, with regard to the top tank portion, a first threshold recovery time associated with an occupancy status indicating occupancy and a second threshold recovery time associated with the occupancy status indicating non-occupancy;

determining, based on a most recently measured temperature of the first temperatures and the first drive curve, a first recovery time required to drive the water in the top tank portion from the most recently measured temperature of the first temperatures to a first setpoint temperature;

determining the occupancy status indicative of whether individuals are present in an area proximate the water heater;

operating the top heating element in response to determining that: (1) the occupancy status indicates occupancy, and (2) the first recovery time is less than or equal to the first threshold recovery time; and operating the top heating element in response to determining that: (1) the occupancy status indicates non-occupancy, and (2) the second recovery time is less than or equal to the second threshold recovery time.

22. The method of claim 21, further comprising:

measuring second temperatures over time of water in a bottom tank portion of the water heater;

characterizing second drift and drive curves of the bottom tank portion of the water heater based on the measured second temperatures;

defining, with regard to the bottom tank portion, a third threshold recovery time associated with the occupancy status indicating occupancy and a fourth threshold recovery time associated with the occupancy status indicating non-occupancy;

determining, based on a most recently measured temperature of the second temperatures and the second drive curve, a second recovery time required to drive the water in the bottom tank portion from the most recently measured temperature of the second temperatures to a second setpoint temperature;

operating the top heating element in response to determining that: (1) the occupancy status indicates occupancy, and (2) the second recovery time is less than or equal to the third threshold recovery time; and operating the top heating element in response to determining that: (1) the occupancy status indicates non-occupancy, and (2) the second recovery time is less than or equal to the fourth threshold recovery time.

23. The method of claim 22, further comprising:

monitoring hot water usage over time;

determining a hot water usage latency by characterizing hot water usage over time relative to the occupancy status changing from not occupied to occupied; and wherein the each of the second and fourth recovery times are determined relative to the hot water usage latency.

24. The method of claim 23, further comprising:

receiving a geolocation signal indicative of a physical location of an individual;

estimating a time until arrival of the individual; and operating the top heating element in response to the estimated time until arrival being less than or equal to the second recovery time.

* * * * *